Patented Feb. 5, 1952

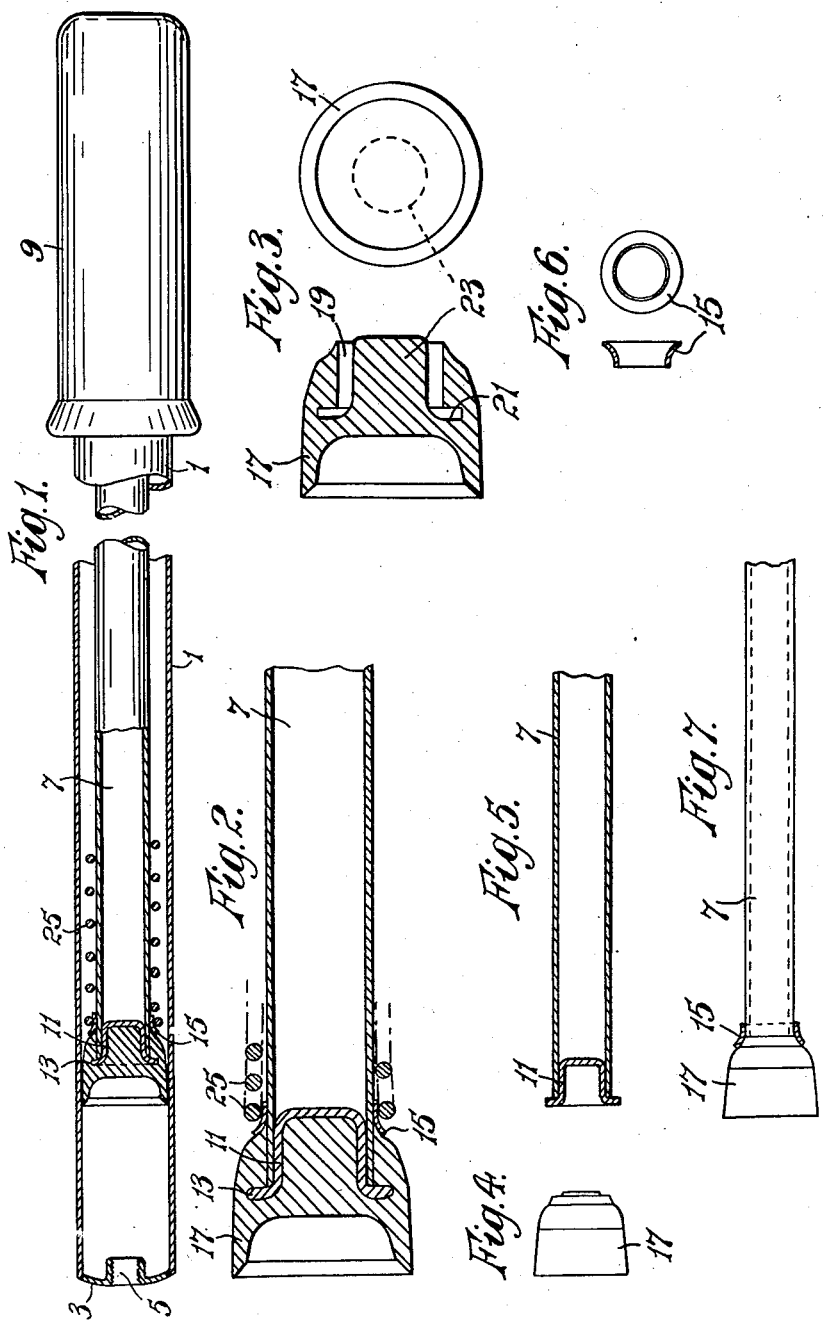

2,584,926

UNITED STATES PATENT OFFICE 2,584,926

PLUNGER FOR INFLATING PUMPS

Herman Jan Walter Roll, Dorridge, England, assignor to The Birmingham Small Arms Company Limited, Birmingham, England, a British company Application July 28, 1950, Serial No. 176,386
In Great Britain August 5, 1949

4 Claims. (Cl. 309—4)

This invention relates to pistons or plungers for inflating pumps, and is concerned more particularly with washers constituting the plungers of pneumatic tyre pumps.

Washers which constitute parts of inflator plungers usually consists of a suitably shaped leather disc secured to one end of a plunger rod by a headed screw which is received in a threaded block held in the end of the plunger rod, the base of the washer being backed by a flanged metal disc which serves to prevent deformation of the base portion of the washer.

In an earlier plunger construction for inflators obviating the use of a fixed screw for attaching the washer to the plunger rod, there is disclosed an arrangement wherein a washer of cup-shaped formation, fabricated from a plastic material such as polyvinyl chloride, is secured to the plunger rod through the medium of a re-entrant groove formed in the washer which is adapted to be engaged by an outwardly directed flanged part on the end of the plunger rod, and wherein the washer is further provided with a depending tail position adapted to be received in the end of said plunger rod.

In such construction however there is a tendency in use of the inflator for deformation of the washer to occur during reciprocation of the piston or plunger in the pump barrel, thereby impairing the efficiency of the inflator.

It is an object of the present invention to provide an improved construction of washer for an inflator piston or plunger in which the tendency to become deformed is minimised and wherein the washer does not require any extraneous form of fastening means for securing it to the plunger rod.

According to this invention the piston or plunger comprises a cup-shaped washer having an axial hole terminated by a re-entrant groove, an integrally formed stud portion projecting from the groove and coaxially disposed in relation to the hole in the washer, a flanged cup member fitted to the end of the plunger rod engagement with the groove and stud portion, and a disc mounted on the plunger rod adapted to engage with and constitute a support for the rear end of the washer.

In order that the invention may be clearly understood, such will now be more fully described, by way of example, with reference to the accompanying drawings, in which:

Figure 1 shows in part section an inflator constructed in accordance with the features of the invention;

Figure 2 is a fragmentary part sectional view, on an enlarged scale, of the plunger and plunger rod shown in Figure 1;

Figure 3 is a sectional side elevation and an end view, on an enlarged scale, of the plunger washer;

Figure 4 is a side elevation of the plunger washer;

Figure 5 is a fragmentary part sectional view of the plunger rod;

Figure 6 is a sectional side elevation and an end view of the disc or ring member, and Figure 7 is a fragmentary view showing the plunger attached to the plunger rod.

The illustrative inflator, as shown in Figure 1, is intended for use on cycles and comprises an exterior cylinder or barrel 1, preferably fabricated from a suitable synthetic resinous material, having formed on or secured thereto an end piece or cap 3 which is provided with a threaded nipple 5 for the reception of one end of a flexible connection the other end of which is adapted to be attached to the valve of a pneumatic tyre. The opposite end of the barrel, according to conventional practice in the construction of cycle pumps, is internally threaded for the reception of a screwed cap (not shown) which is arranged to constitute a bearing for a plunger rod 7, to the outer end of which is secured a handle 9.

The plunger rod 7 comprises a metal tube the inner end of which, i. e. remote from the handle 9, is flanged. This flanging is preferably formed by inserting in the end of the tube a hollow metal pressing 11 of cup-shaped formation having an outwardly directed flange 13, said cup-shaped pressing being secured to the tube preferably by a spot welding operation. Alternatively the member 11 could be detachably secured to the tube 7 by any suitable means. On the outside of the tube is mounted a support ring or disc 15 for the purpose hereafter described.

Over the flanged end of the plunger rod 7, and constituting the plunger, is fitted a washer 17 which is preferably moulded from an oil-resistant synthetic resinous material such as polyvinyl chloride. As seen in Figure 3 the washer 17 is of cup-shaped formation, the external diameter being equal to or slightly in excess of the internal diameter of the barrel 1, and having a bevelled wall to ensure greater flexibility at the front of the washer. At the rear of the washer 17 is formed during moulding an axial hole 19, the diameter of which corresponds to the external diameter of the plunger rod 7. This axial hole 19 is terminated by a shallow circular recess 21 the diameter of which exceeds that of the hole 19, so that in effect a re-entrant groove is formed in the washer 17 about mid-way of its length. Extending rearwardly from the recess 21 and co-axial with the hole 19 is further formed in the moulding of the washer a stud or projection 23, the diameter of which corresponds with the internal diameter of the cup-shaped pressing 11.

The support ring or disc 15, as seen in Figure 6, is produced as a bell-mouthed metal pressing, having a central aperture corresponding to the diameter of the plunger rod 7 on which it is mounted, said disc being adapted to abut against a complementary surface formed on the rounded rear end face of the washer.

The washer 17 and plunger rod 7 prior to assembly of the plunger appear as shown in Figures 4 and 5, while the plunger and disc 15 after fitment to the plunger rod appear as shown in Figures 2 and 7. The washer is forced over the end of the plunger rod until the flange 13 engages with the recess 21, and simultaneously the stud 23 will have seated itself in the cup-shaped pressing 11, in which position the rear portion of the washer 17 will close over the outer surface of the plunger rod. The disc 15 and a coil spring 25 having been passed over the outer end of the rod (prior to the fixing of the handle 9), the disc is held against its seating on the rear end face of the washer, in which position it is retained by the end coil of the spring 25 closing over the disc, as seen in Figure 2.

Although in the arrangement above described the cup-shaped pressing 11 is permanently fixed to the end of the plunger rod 7, it will be appreciated that the member 11 could be rendered detachable from the plunger rod without departing from the scope of the invention.

It will be appreciated that a pump plunger constructed in accordance with the features of this invention not only ensures a firm and distortion resistant mounting for the washer, but also requires no extraneous form of fastening means for securing it to the plunger rod.

Having thus described my invention, what I claim as new and desire to secure by Letters Patent is:

1. A plunger for inflating pumps having a cylindrical barrel in which is mounted for reciprocation a hollow tube constituting a plunger rod to which the plunger is adapted to be secured, wherein the plunger comprises a cup-shaped washer having an axial hole terminated by a re-entrant groove, an integrally formed stud portion projecting from the groove and co-axially disposed in relation to the hole in the washer, a flanged cup member fitted to the end of the plunger rod engaging with the groove and stud portion, and a disc mounted on the plunger rod adapted to engage with and constitute a support for the rear end of the washer.

2. A plunger for inflating pumps according to claim 1, wherein the washer is moulded from an oil-resistant synthetic resinous material.

3. A plunger for inflating pumps according to claim 1, wherein the flanged cup member is detachably secured to the plunger rod.

4. A plunger for inflating pumps according to claim 1, wherein the disc is held against the washer seating by a coil spring mounted on the plunger rod and engaging with the disc.

HERMAN JAN WALTER ROLL.

REFERENCES CITED

The following references are of record in the file of this patent:

UNITED STATES PATENTS

| Number | Name | Date |
| --- | --- | --- |
| 1,075,468 | Edgecomb | Oct. 14, 1913 |
| 1,606,511 | Carson | Nov. 9, 1926 |